United States Patent [19]

Feuchtwanger

[11] Patent Number: 4,924,308
[45] Date of Patent: May 8, 1990

[54] BANDWIDTH REDUCTION SYSTEM FOR TELEVISION SIGNALS

[75] Inventor: David Feuchtwanger, London, England

[73] Assignee: Thorn EMI plc, London, England

[21] Appl. No.: 319,714

[22] Filed: Mar. 7, 1989

[30] Foreign Application Priority Data

Mar. 10, 1988 [GB] United Kingdom ................. 8805742

[51] Int. Cl.$^5$ .............................................. H04N 7/12
[52] U.S. Cl. .................................... 358/133; 358/105
[58] Field of Search ................... 358/105, 11, 12, 138, 358/133, 135, 136, 140

[56] References Cited

U.S. PATENT DOCUMENTS 4,785,348 11/1988 Fonsalas et al. .................... 358/133

Primary Examiner—James J. Groody
Assistant Examiner—Victor R. Kostak
Attorney, Agent, or Firm—Fleit, Jacobson, Cohn, Price, Holman & Stern

[57] ABSTRACT

A bandwidth reduction system for television signals employs three spatial filter circuits capable of imposing respective resolution characteristics on the signals. The filters are selectively switched into the path of the signals in dependence upon the degrees motion occurring in respective spatial portions of the television picture. A relatively high resolution is allowed where virtually no movement is taking place and a relatively low resolution where rapid movement is taking place. Intermediate resolution is imposed where the degree of motion in a given spatial portion of the television picture is finite but less than said rapid movement.

4 Claims, 2 Drawing Sheets

/// STATIC MODE    \\\ INTERMEDIATE MODE    ||| MOTION MODE

BANDWIDTH REDUCTION SYSTEM FOR TELEVISION SIGNALS

BACKGROUND OF THE INVENTION

The present invention relates to a bandwidth reduction system for television signals and it relates especially, though not exclusively, to such a system for use with high definition television (HDTV) signals.

It is accepted that HDTV signals require bandwidth reduction in order to permit them to be broadcast or otherwise disseminate within transmission channels available, and R. Storey has described, in a BBC Research Report PH-280 (BBC RD 1986/5) certain expedients that might be adopted in order to achieve bandwidth reduction of HDTV signals. In particular, Storey contemplates the use of an adaptive filtering system which treats stationary and moving areas of the picture differential, i.e. by imposing different degrees of spatial filtering upon signals deriving from the different areas of the picture, depending upon whether or not a predetermined amount of motion is taking place in each of those areas.

Storey also envisages that the protocol governing the switching at the receiver necessary to accommodate the receiver to the variations in the television signals, caused by the variable filtering, should be controlled by a digital signal, generated at the transmitter, that is determined by the "clean" signals prior to transmission and thus rugged and reliable. The use of this digital control signal is called Digitally Assisted Television (DATV) by Storey.

The spatial filtering adopted by the BBC is shown in FIG. 1 and it can be seen that "diagonal" filtering is used both for static mode and motion mode filtering; the original TV source characteristic being shown as dashed lines.

It has been proposed that step function filtering (i.e with the filtered signal having characteristics similar to, but scaled down from, those of the original TV picture and thus consisting of lines parallel to the two dashed lines in FIG. 1 would be more appropriate for HDTV, but it is believed that the published data has not revealed the optimum filtering arrangements, and neither have the compatible switching protocols been devised.

SUMMARY OF THE INVENTION

This invention has the object of providing a bandwidth reduction system for television signals which achieves acceptable filtering and provides appropriate switching protocols.

In particular, the invention provides for first, second and third spatial filters to be selectively imposed upon the television signals at the encoder; the filters being respectively designed for use in static, intermediate and motion modes. Further the filters for use in the static and intermediate modes impose a common vertical definition upon the television signals whereas the filters for use in the intermediate and motion modes impose a common horizontal definition upon the television signals.

BRIEF DESCRIPTION OF THE DRAWINGS

In order that the invention may be clearly understood and readily carried into effect, one embodiment thereof will now be described, by way of example only, with reference to the accompanying drawings, of which, FIG. 1 has already been referred to, FIG. 2 represents, in similar manner to FIG. 1, the filtering imposed upon television signals in accordance with an example of this invention.

DESCRIPTION OF THE PREFERRED EMBODIMENT

Figure 1:
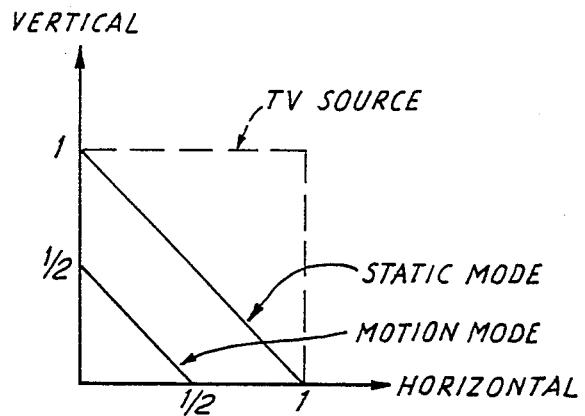
Figure 2:
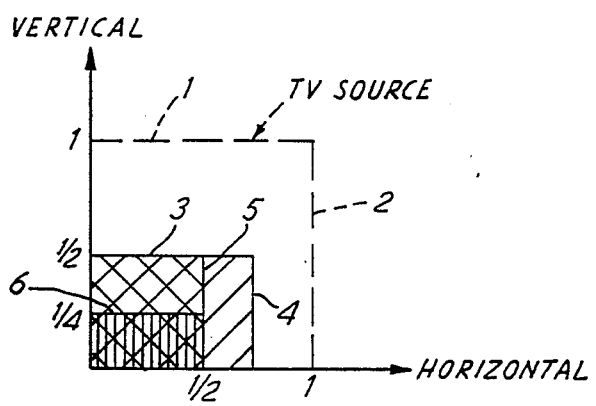

Referring now to FIG. 2, the TV signal source characteristic is shown by the dashed lines 1 and 2. The filter for use in the static mode, in which the highest resolution is required, imposes upon the television signals vertical definition represented by the horizontal line 3 and horizontal definition represented by the vertical line 4.

The filter for use in the intermediate mode imposes vertical definition exactly as for the static mode and thus is represented by the line 3 but the horizontal resolution is reduced as indicated by the positioning of vertical line 5. This latter line also represents the horizontal resolution in the motion mode but, in this case, the vertical resolution is further reduced to the extent indicated by the horizontal line 6.

Figure 3:
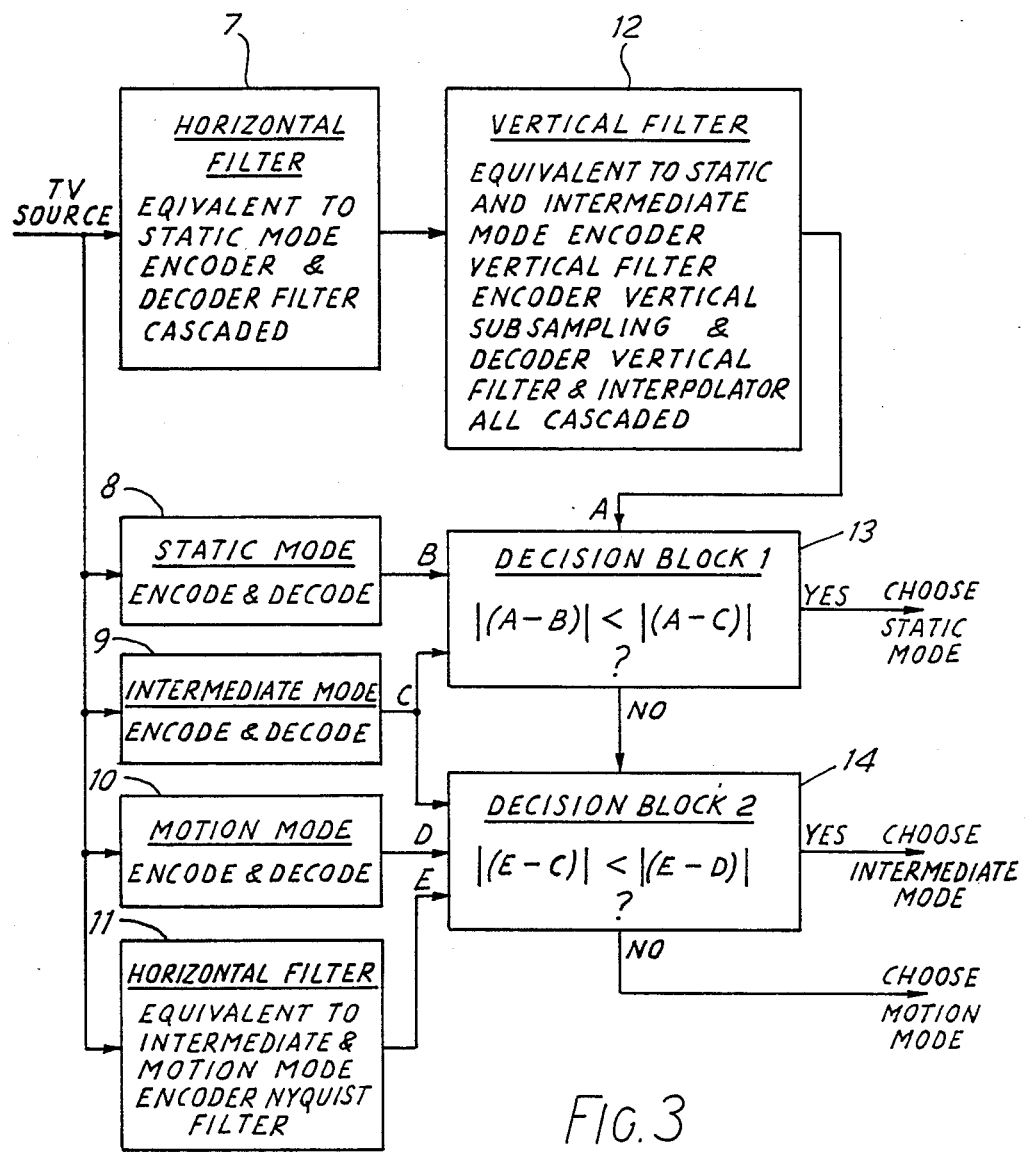
FIG. 3 shows, in block diagrammatic form, a circuit arrangement capable of implementing a mode selection protocol for the filtering arrangement of FIG. 2.

A circuit arrangement for implementing the filtering shown in FIG. 2 is shown in FIG. 3. The full definition television source signal is applied in parallel to circuits 7 through 11. Circuit 7 represents a horizontal filter, equivalent to the static mode encoder and decoder filters cascaded. The output of circuit 7 is applied to a circuit 12 which represents a vertical filter equivalent to the static and intermediate mode encoder vertical filter, encoder vertical sub-sampling and decoder vertical filter and interpolator, all cascaded. The output of circuit 12 provides a first input A to a first decision circuit 13. This decision circuit 13 also receives a second input B from circuit 8, representing the static mode encoding and decoding circuits, and a third input C from circuit 9 representing the intermediate mode encoding and decoding circuits. Circuit 13 is arranged to compare $|(A-B)|$ with $|(A-C)|$ and to select the static mode filtering if $|(A-B)| < |(A-C)|$. If $|(A-B)| \not< |(A-C)|$, circuit 13 is arranged to energise a second decision circuit 14. This latter circuit 14 receives input C from circuit 9 and also an input D from circuit 10, which represents the motion mode encoding and decoding circuits. Circuit 14 also receives an input E from circuit 11, which is equivalent to the intermediates and motion mode encoder nyquist filter.

Circuit 14 is arranged to select intermediate filtering if $|(E-C)| < |(E-D)|$ and to select motion filtering if $|(E-C)| \not< |(E-D)|$.

It will be observed that the decision circuits 13 and 14 are arranged to select on the basis of the magnitude of the two "error" terms specified in each case. It can be advantageous to incorporate thresholding into these decisions and one decision circuit may even use the difference between the two "error" terms used in the other decision circuit as part of its threshold.

I claim:

1. A bandwidth reduction system for television signals comprising static, intermediate and motion mode processor circuits for encoding the television signals and spatially filtering the horizontal and vertical resolution of the television signals, respectively, in dependence upon whether features in spatial areas of a television picture represented by the signals are static, moving at less than a predetermined rate, or moving at more than a predetermined rate, the processor circuits including decoding means for providing reconstituted television signals from the signals encoded and filtered thereby; a filter circuit for imposing spatial filtering on the horizontal and vertical resolution of the television signals substantially corresponding to that imposed by the static mode processor circuit; and a selection circuit for receiving the reconstituted television signals from the static, intermediate and motion mode processor circuits and the filtered signal from the filter circuit and for determining therefrom the static, intermediate or motion mode processor for imposition on the television signals to effect bandwidth reduction to the television signals in dependence upon the degrees of motion in the spatial areas of the television picture represented by the television signals.

2. A bandwidth reduction system according to claim 1 further comprising an additional filter circuit for imposing spatial filtering on the horizontal resolution of the television signals substantially corresponding to that imposed by the intermediate and motion mode processor circuits, and wherein the selection circuit comprises a first decision circuit, arranged to receive the reconstituted television signals from the static and intermediate mode processor circuits and the filtered signal from the filter circuit and to compare the filtered signal with the reconstituted signals so as to provide an output signal for effecting the imposition of the static mode processor circuit on the television signals, and a second decision circuit arranged to receive the reconstituted signals from the intermediate and motion mode processor circuits and the filtered signal from the additional filter circuit and to compare the filtered signal received thereby with the received reconstituted television signals so as to provide an output signal for effecting the imposition of either the intermediate mode processor circuit or the motion mode processor circuit on the television signals.

3. A bandwidth reduction system according to claim 1 wherein the static and intermediate mode processor circuits are arranged to impose on said television signals substantially identical filtering of the vertical resolution but differing filtering of the horizontal resolution.

4. A bandwidth reduction system according to claim 1 wherein the intermediate and motion mode processor circuits are arranged to impose on said television signals substantially identical filtering of the horizontal resolution but differing filtering of the vertical resolution.

* * * * *